Jan. 27, 1970  R. F. DEIKE  3,492,032
TENSION CAP
Filed Aug. 13, 1968
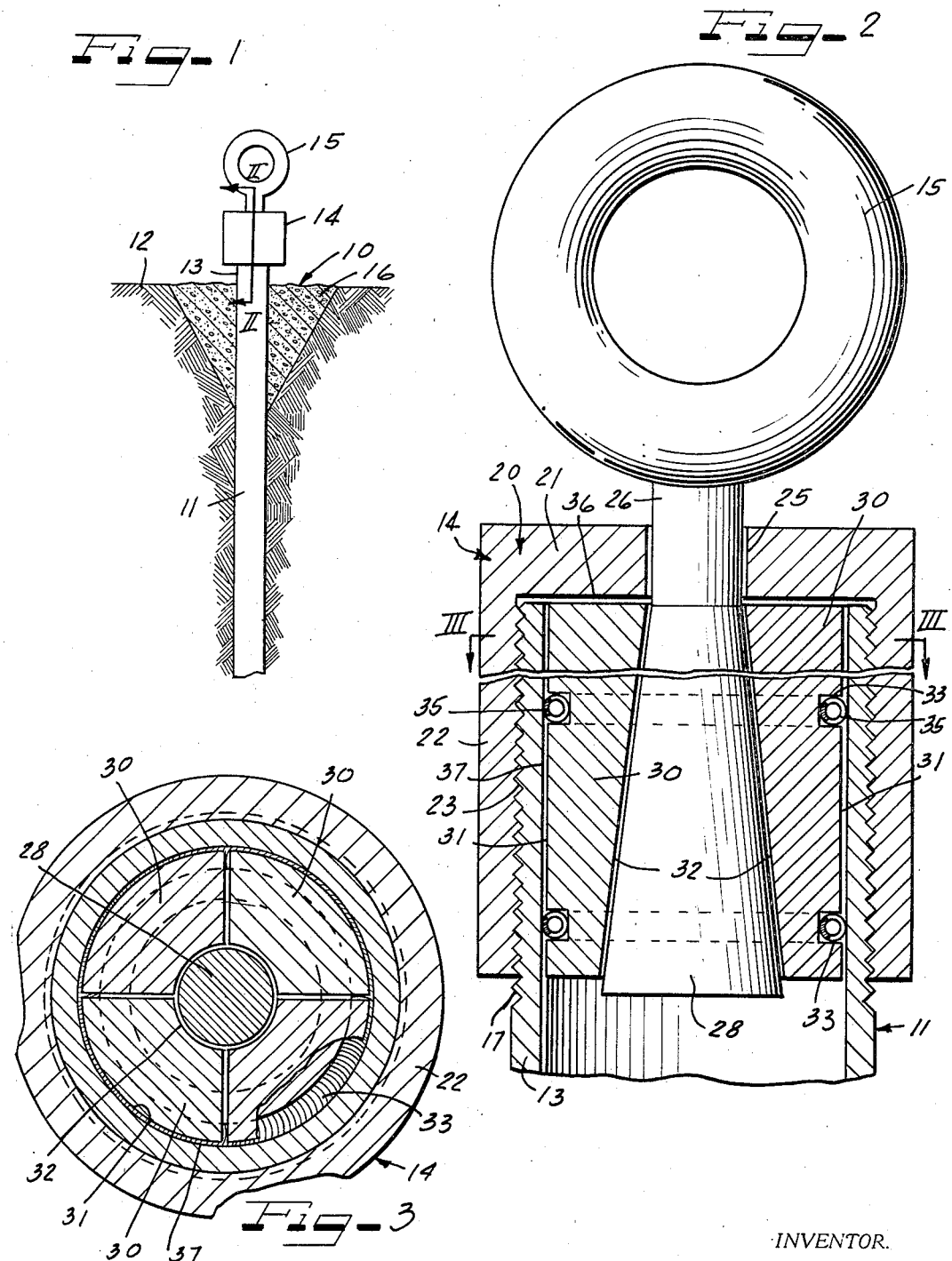
INVENTOR.
ROBERT F. DEIKE
BY *Hill, Sherman, Meroni, Gross & Simpson* ATTORNEYS

# United States Patent Office 3,492,032
Patented Jan. 27, 1970

3,492,032
TENSION CAP
Robert F. Deike, Cheyenne, Wyo., assignor of one-fourth to Wyoming Investment Company, Inc., Cheyenne, Wyo., a corporation of Wyoming, and one-fourth to William H. Chamberlin, Laramie County, Wyo.
Filed Aug. 13, 1968, Ser. No. 752,273
Int. Cl. B25g 3/28; F16b 9/00
U.S. Cl. 287—20.3                                5 Claims

ABSTRACT OF THE DISCLOSURE

A cap for attaching an anchor bolt to a threaded pipe which consists of a cup-shaped cup for threading over the end of the pipe, a bolt with a stem extending through the end wall of the cap terminating in a frusto-conical mandrel surrounded by circumferential wedges inside the cap radially inward from the cap threads. After threading of the cap onto the end of a pipe, which may be buried in the ground as an anchor, tension force on the bolt will draw the mandrel against the wedge members to expand them radially outwardly against that portion of the pipe wall which is embraced by the caps thereby clamping the pipe between the wedges and cap. Garter springs embrace the wedges to contract them.

BACKGROUND OF THE INVENTION

Field of the invention

This invention relates to anchor bolts, and the more particularly to an anchor bolt carrying end cap for a pipe or tube which has a wedge assembly clamping the pipe between the cap and wedge and increasing the gripping relationship between the cap and the pipe.

Prior art

Anchoring devices using expansible wedge members are known to the art. Such prior art anchoring devices have usually been of the type designed to be received in a bore or hole such as in a concrete wall where the expansion of the wedge members has been against the side wall of the bore. Such prior art devices are not adaptable for use in connection with ground anchors where the wedge expansion force would act simply to compact the earth around the wedge member. In such cases, the earth would give way under pressure and the anchor would not hold.

Prior art ground anchors, on the other hand, have usually been restricted to one-piece anchors which extend unbrokenly into the ground and which have had the attachment means integral with the portion which extends into the ground. This can result in difficulties in placing the anchor within the ground because of the presence of the attachment means at the end of the anchor device.

SUMMARY OF THE INVENTION

The present invention overcomes these deficiencies in the prior art by providing a cup-like cap which can be screwed or otherwise secured onto the end of an anchor pipe after the pipe has been embedded in the ground. In this manner, the pipe end is not encumbered with an attaching device such as an eye bolt during installation of the pipe into the ground. The attachment device, which may be an eye bolt, a hook or the like, is carried by the cap and has a stem portion slidable through the end wall of the cup-shaped cap terminating in a diverging tapered or frusto-conically shaped mandrel portion which is surrounded by a plurality of circumferentially split or separated wedge-shaped members. After the cap has been threaded or otherwise applied onto the end of the pipe as by a bayonet slot and pin connection, a tension force applied on the attachment means will pull the frustro-conically shaped mandrel towards the end wall of the cap. This will bring mating inclined faces of the frusto-conical portion and the wedge members into contact. Further axial movement of the mandrel will radially expand the wedge members into contact with the inside of the ground anchor pipe. This will cause an expansion of the pipe into tight gripping relationship with the cap. The wall thickness of the cap is sufficiently great to prevent it from splitting or bursting under the radial expansion force created by the wedge members. Thus, the application of a tension force against the attachment means will be partially transmitted into a radial force by the wedge members, which radial force will be directed against the ground anchor pipe, seating the cap more firmly on the pipe.

In a preferred embodiment, garter springs are provided around the wedge members to retain them on the mandrel.

When it is desired to remove the cap and attachment device, a downward blow on the attachment device will cause the mandrel to move away from the end wall of the cap thereby releasing the radial expansion force against the wedge members. The wedge members will then be radially withdrawn by the action of the springs from contact with the inside diameter of the pipe. Thereafter, the cap may be unthreaded or uncoupled from the pipe end.

It is therefore an object of this invention to provide a device for removably attaching an anchor bolt or the like to a ground anchor.

It is a further object of this invention to provide a tension cap carrying an anchor bolt or the like attachment means which may be removably threaded upon the end of a pipe and which carries expansible members therein to clamp the pipe between the members and the cap.

It is yet another and more specific object of this invention to provide a device for attaching an anchor bolt or the like device to a ground anchor pipe wherein part of the tension force directed against the anchor bolt is transferred to a radial expansion force to more securely connect the device to the anchor pipe.

Other and further objects of this invention will be apparent to those skilled in this art from the following detailed description of the annexed sheets of drawings which, by way of a preferred embodiment of the invention, illustrate one example of the invention.

BRIEF DESCRIPTION OF DRAWINGS

FIGURE 1 is a fragmentary elevational view, partially in section, of a ground embedded anchor having a tension cap embodying the principles of this invention mounted thereon.

FIGURE 2 is an enlarged fragmentary vertical cross-sectional view taken along the line II—II of FIG. 1 and showing the bolt in elevation and rotated 90°.

FIGURE 3 is a horizontal cross sectional view taken along the line III—III of FIGURE 2.

DESCRIPTION OF THE PREFERRED EMBODIMENT

FIGURE 1 illustrates generally a ground anchor 10 such as may be used in anchoring guy wires and the like to the ground. The anchor 10 consists of an anchor pipe or post 11 embedded below the surface of the ground 12 which has a small portion 13 extending above the ground on which is fitted the tension cap 14 of this invention. The tension cap 14 carries an eyebolt 15. However, it is to be understood that the invention may be worked with anchoring devices other than eye bolts such as hook bolts, turnbuckle threadings, etc. In order to to prevent wobbling of the anchor pipe 11 in the ground, FIGURE 1 illustrates the use of an inverted cone of cement or the like, 16, adjacent the surface of the ground 12.

As is illustrated in FIGURE 2, the anchor pipe 11 is a hollow pipe having male threads 17 at the end 13 thereof which projects above the ground. It is to be understood that although the anchor pipe 11 is referred to as being a hollow pipe, that it could well be a collar or other hollow cylindrical device attached to an anchor rod or the like.

Then tension cap 14 consists of a cup-shaped housing 20 which has an end wall 21 and a cylindrical side wall 22. The inside diameter of the side wall 22 has female threads 23 adapted to mate with the male threads 17 of the pipe end 13.

An aperture 25 is provided centrally through the end wall 21 of the cup-shaped housing 20. An eye bolt 15 is illustrated in the preferred embodiment as having a stem portion 26 which extends through the aperture 25 to the interior of the cup-shaped housing 20. The stem portion 26 terminates in a diverging frusto-conical mandrel 28 which increases in diameter from the stem 26 to the end thereof. The mandrel 28 may be formed integrally with the stem 26 or may be attached thereto as by screw threads, welding, or the like attachment methods.

Positioned around the mandrel are a plurality of fragmental cylindrical wedge blocks 30. The blocks 30 encircle the mandrel and have cylindrical diameter walls 31 and tapered inner diameter walls 32. The taper of the inner diameter walls 32 mates with the taper of the frusto-conical mandrel 28. Circumferential grooves 33 extend around the blocks 30 and are cut into the outer diameter thereof. Endless coil springs or garter springs 35 or the like constriction devices are placed in the grooves 33. The constriction of the springs 35 acts to retain the blocks 30 in position encircling the mandrel 28.

The outer diameter of the wedge blocks 30 is sized so that the mandrel and blocks, when in their most constricted state, may be freely received within the hollow pipe end 13. In this manner, the cup-shaped housing 20, mandrel 28 and blocks 30 may all be fastened to the end 13 of the pipe 11 by threading of the cap thereonto.

After the tension cap 14 has been threaded onto the end 13 of the pipe 11, application of a tension force against the ring bolt 15 will pull the mandrel axially upwardly. Axially upward movement of the mandrel will cause the wedge blocks 30 to move upwardly until they contact the inside face 36 of the end wall 21 of the housing. Thereafter, further axial movement of the blocks will be prevented and additional vertical movement of the mandrel 28 will cause the blocks 30 to radially expand into contact with the inside diameter wall 37 of the end 13 of the pipe 11. Continued tension force on the eye bolt will increase the radial expansion pressure of the wedge blocks 30 against the pipe wall causing the male threads 17 to mesh with the female threads 23 of the cap with an increased pressure. Bulging or splitting of the pipe is prevented by the circumferential expansion strength of the tension cap 14 which is constructed of a material having a strength and wall thickness sufficiently great to withstand anticipated pressures. Therefore, it can be seen that the circumferential expansion force created by the mating wedge faces of the mandrel and wedge blocks will increase the attachment between the pipe and tension cap and clamp the pipe between the blocks and caps. Therefore, as the force tending to strip the cap off of the end of the pipe increases, the radial expansion force also increases to counter the stripping force.

When it is desired to remove the tension cap from the anchor pipe 11, a downward force on the ring bolt 15, such as that provided by a sharp blow, will cause the mandrel 28 to move vertically downwardly away from the inside face 36 of the end wall 21. This will provide a space between the outer diameter of the mandrel and the inner diameter of the wedge blocks 30. The presence of a space there will allow the coil springs 35 to contract the wedge blocks 30 to move them away from the inner diameter of the pipe. Thereafter, the tension cap 14 may be unscrewed from the pipe end.

It can therefore be seen from the above that my invention provides for a device which is readily attached to and removed from a ground anchor and which provides for attachment of the apparatus to be anchored to the anchor. The invention provides wedge means which are received interior of the hollow end of a portion of the anchor which are expansible in dependent relation to the anchoring force to increase the attachment strength between the device and the anchor.

Although I have herein set forth my invention with respect to certain specific principles and details thereof, it will be understood that these may be varied without departing from the spirit and scope of the invention as set forth in the hereunto appended claims.

I claim as my invention:

1. In combination:
   a ground anchor having a hollow end portion with cap securing means thereon,
   a cup-shaped end cap having an open end, a side wall embracing said hollow end portion and an end wall overlying said hollow end portion,
   means on said side wall of the cap interlocked with said cap securing means of said hollow end portion,
   said end wall having an aperture therethrough,
   an attachment member having a portion projecting freely through said aperture and terminating in said cap in a mandrel portion.
   said mandrel portion being tapered to increase in area away from said end wall and toward the open end of said cap,
   a plurality of expansion blocks encircling said mandrel opposite the interlocked portions of said side wall and hollow end portion,
   said expansion blocks having an outer diameter adapted to mate with the inner diameter of said hollow end portion and an inner diameter having a taper adapted to mate with the taper of said mandrel, and
   said expansion blocks being expandable by said mandrel into mating contact with said hollow end portion which is embraced by said side wall of the cap by movement of said mandrel in response to tension force on said attachment member whereby the hollow end portion is clamped between the said wall of the cap and said expansion blocks to further strengthen said interlock of the cap with the anchor.

2. The combination of claim 1 wherein the cap securing means on the ground anchor and the means on the side wall of the cap interlocked therewith are interengaging threads.

3. The combination of claim 1 including contracting spring means holding the expansion blocks on the mandrel.

4. The combination of claim 1 wherein the expansion blocks abut the end wall of the cap when the attachment member is under tension load and are free from said end wall when said load is released.

5. In combination,
   a post having a hollow exteriorly threaded end portion,
   a cup-shaped cap having an interiorly threaded side wall portion threaded on and embracing said hollow end portion of the post,
   said cap having an apertured closed end overlying the hollow end of the post,
   a bolt extending through the apertured closed end of said cap,
   a tapered mandrel on said bolt inside said hollow end portion increasing in diameter toward the open end of said cap, wedge blocks located opposite the threaded connection between said side wall and said hollow end portion and mating with and surrounding said mandrel having end walls adapted to engage said closed end of the cap, means readily contracting said wedge blocks into spaced relation from said hollow end portion of the post, and said bolt being shiftable relative to said cap and post under tension load to draw the mandrel into the wedge blocks and the wedge blocks against the end wall of the cap for expanding the blocks against the hollow post whereby the post is clamped between the cap and the blocks to strengthen the threaded connection of the cap and post until the tension load is released from the bolt whereby reverse shifting of the bolt will release the blocks and unclamp the post to accommodate unthreading of the cap from the post.

References Cited

UNITED STATES PATENTS

| | | | |
|---|---|---|---|
| 1,897,561 | 2/1933 | Manucci et al. | 294—94 |
| 2,536,431 | 1/1951 | Endsley | 294—86.25 XR |
| 2,624,610 | 1/1953 | Murphy | 294—96 |
| 3,070,128 | 12/1962 | Collins et al. | 138—89 |
| 3,117,485 | 1/1964 | Jansen | 287—20.3 XR |

FOREIGN PATENTS 495,040    4/1950    Belgium.

DAVID J. WILLIAMOWSKY, Primary Examiner

ANDREW V. KUNDRAT, Assistant Examiner

U.S. Cl. X.R.

294—94